US010753878B2

United States Patent
Hudson et al.

(10) Patent No.: US 10,753,878 B2
(45) Date of Patent: Aug. 25, 2020

(54) MOLTEN METAL INCLUSION TESTING

(71) Applicant: Worcester Polytechnic Institute, Worcester, MA (US)

(72) Inventors: Shaymus W. Hudson, Cambridge, MA (US); Diran Apelian, W. Boylston, MA (US); Robert DeSaro, Worcester, MA (US); Joseph C. Craparo, Plainfield, NJ (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 16/136,232

(22) Filed: Sep. 19, 2018

(65) Prior Publication Data

US 2019/0128811 A1 May 2, 2019

Related U.S. Application Data

(60) Provisional application No. 62/560,896, filed on Sep. 20, 2017.

(51) Int. Cl.
*G01N 21/94* (2006.01)
*G01N 21/71* (2006.01)

(52) U.S. Cl.
CPC .......... *G01N 21/718* (2013.01); *G01N 21/94* (2013.01); *G01N 2201/125* (2013.01)

(58) Field of Classification Search
CPC .. G01N 21/718; G01N 21/8507; G01N 21/94; G01J 3/443; G01J 3/2823
See application file for complete search history.

(56) References Cited

U.S. PATENT DOCUMENTS

| 6,337,564 | B2 | 1/2002 | Manzini et al. |
| 6,784,429 | B2 | 8/2004 | De Saro et al. |
| 6,909,505 | B2 | 6/2005 | Lucas et al. |

(Continued)

FOREIGN PATENT DOCUMENTS

| JP | 6042694 A | 3/1985 |
| WO | WO 1990/013008 A | 11/1990 |
| WO | WO 1995/003546 A1 | 2/1995 |

OTHER PUBLICATIONS

C. Argon, "Determination of Carbon Content in Molten Steel Using Laser-Induced Breakdown Spectroscopy",1993, Applied Spectroscopy (Year: 1993).*

(Continued)

*Primary Examiner* — Maurice C Smith
(74) *Attorney, Agent, or Firm* — Armis IP Law, LLC

(57) ABSTRACT

A molten metal inclusion test apparatus includes a spectroscopic appliance for gathering data indicative of the contents of a quantity of molten metal. Laser induced emissions provide spectral data based on the elements present in the melt. Analysis of a series of samplings, or "shots" of laser induced emissions indicates a presence of elements above a background or expected level. These elements appear as spikes in a graphical rendering of the spectral data, defined by a wavelength of the detected element. Correlation of the elements detected in the same shot indicates a composition of the inclusion, typically a particle of an extraneous compound in the melt. Such spectral analysis provides immediate feedback about melt quality, allowing corrective measures to be taken prior to casting.

13 Claims, 7 Drawing Sheets

(56) References Cited

U.S. PATENT DOCUMENTS

| | | | |
|---|---|---|---|
| 7,748,258 B2 * | 7/2010 | Sattmann | G01J 5/0037 73/64.56 |
| 2003/0197125 A1 * | 10/2003 | De Saro | G01N 33/205 250/339.07 |
| 2015/0284763 A1 * | 10/2015 | Rehse | G01N 21/718 435/34 |
| 2016/0084709 A1 * | 3/2016 | Day | G01J 3/30 356/318 |
| 2016/0252398 A1 * | 9/2016 | Day | G01J 3/443 356/318 |

OTHER PUBLICATIONS

International Search Report, PCT/US2018/51832, pp. 3, dated Dec. 13, 2018.

* cited by examiner

US 10,753,878 B2

MOLTEN METAL INCLUSION TESTING

RELATED APPLICATIONS

This patent application claims the benefit under 35 U.S.C. § 119(e) of U.S. Provisional Patent App. No. 62/560,896, filed Sep. 20, 2017, entitled "MOLTEN METAL INCLUSION TESTING," incorporated herein by reference in entirety.

BACKGROUND

Precision metal casting techniques rely on a specific ratio of raw materials for melting and casting. Raw materials, which may include multiple metals in the case of alloys, are combined in a furnace or heat tolerant container for attaining a desired melting point for combining the raw materials. Impurities in this melt can compromise the qualities of the resulting casting. When such castings are designed for particular strength or structural properties, impurities can compromise the strength or other characteristics, leading to negative results.

SUMMARY

An inclusion test apparatus and method for molten metal includes a spectroscopic appliance for gathering spectral data indicative of the contents of a quantity of molten metal. Laser induced emissions provide spectral data based on the elements present in the melt. Analysis of a series of emissions, or "shots" of laser induced plasma indicates a presence of elements above a background, or expected level. These elements appear as spikes in a graphical rendering of the spectral data, defined by a wavelength of the detected element. Correlation of the elements detected in the same shot indicates a composition of the inclusion, typically a particle of an extraneous compound in the melt. Such spectral analysis provides immediate feedback about melt quality, allowing corrective measures to be taken prior to casting.

Configurations herein are based, in part, on the observation that inclusions such as extraneous particles and contaminants in molten metal may compromise the intended properties of a resulting cast article. Unfortunately, conventional approaches to inclusion testing suffer from the shortcoming that inclusion analysis is performed on solid metal and by-products after casting and cooling. Detected impurities are difficult to correct in a cast item. Testing may include analysis of filtered materials taken from the flow of molten metal, or direct spectroscopy on the cast article. In either case, substantial time and analysis is required. Accordingly, configurations herein substantially overcome the shortcomings of conventional solid metal analysis by providing inclusion analysis for molten metal that performs real-time, in-situ spectroscopic analysis of the molten metal for determining the presence and elemental composition of inclusions prior to casting and solidifying the melt. Spectroscopic data resulting from a series of laser induced emissions of the molten metal identifies anomalies from an expected background level of emissions, and correlates the anomalies to determine an elemental composition of an inclusion defined by the anomalies.

An inclusion measurement device as disclosed herein includes a heat resistant probe adapted for insertion into molten metal for inducing a spectroscopic emission from the molten metal, such that the emission defines inclusions in the molten metal based on concurrent appearance of wavelengths corresponding to elements of a compound in the inclusion. A detection circuit includes comparison logic configured for receiving spectroscopic data based on the emission. The spectroscopic data defines peaks corresponding to elements in the inclusion, such that the detection circuit is adapted to identify peaks indicative of the elements in the inclusion.

The comparison logic identifies elements corresponding to the wavelengths denoted by the spectroscopic data, and identifies a magnitude of the peaks corresponding to the elements in the inclusion. The comparison logic receives data based on a plurality of shots. Each shot is based on an induced emission from the molten metal, and the comparison logic is configured to identify the peaks represented in the same shot as being indicative of the elements in the inclusion.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Aluminum alloy castings are becoming commonplace for critical and high integrity applications in the automotive and aerospace industries where materials failure may have catastrophic results. In order to meet these demands, tight control over the cleanliness of the melt (mitigation of solid particle inclusions) and microstructure is sought. In order to control cleanliness, it must first be well defined and measured. Conventional industry approaches cannot quantitatively and qualitatively measure inclusion levels in-situ.

Technologies such as Laser-Induced Breakdown Spectroscopy (LIBS) can provide elemental information about metal composition. Conventional approaches to LIBS for determining elemental composition of molten metal operate on solid and/or filtered samples, requiring substantial time and surpassing the melt life of a casting batch. In other words, imperfections in the melt cannot be analyzed until after a casting has solidified, possibly causing substantial expense from defective castings. In contrast, configurations herein employ concurrent spectral analysis of emissions to quantify solid particles, desired or undesired, in aluminum and other melts. For example, by performing LIBS with subsequent statistical analysis on liquid aluminum with varying concentrations of inclusion particles, calibration curves relating particle concentration and elemental intensity may be drawn based on a melt before casting.

The approach outlined herein performs method of inclusion testing for molten metal including receiving a plurality of spectroscopic shots of a molten metal, in which each shot is defined by data gathered from an induced emission from the molten metal, and identifying an aberration in the data indicative of an inclusion. Inclusions may be defined by a magnitude and a wavelength, such that the wavelength corresponds to an element in the inclusion. Comparison logic determines, based on a plurality of identified aberrations, a quantity of the element denoted by the identified aberrations. A series of spectroscopic shots each gather a sample of spectral data from the melt for further analysis. The aberrations define peaks in the data, of which each peak corresponds to presence of an element in a volume from which the emission occurs.

For example, inclusions of $Al_2O_3$, $AlB_2$, $TiB_2$ and SiC are typically found in aluminum melts. Inclusions as small as 10 µm in size may be detected, and concentrations down to one part-per-million may be quantified. Any suitable melt may be analyzed by spectroscopic analysis as discussed below, and any element responsive to spectroscopic induced emission may be detected as an inclusion.

Figure 1:
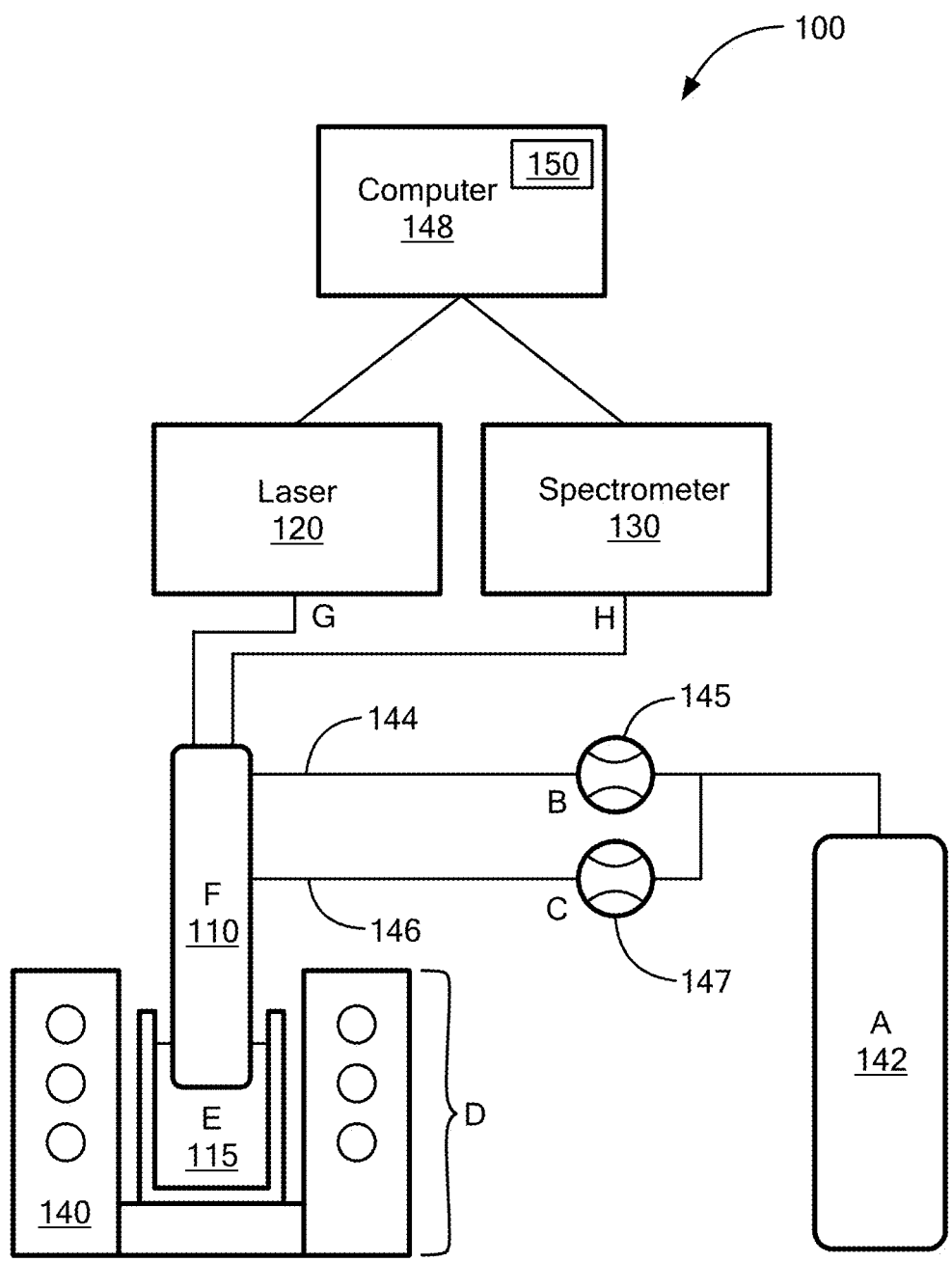
FIG. 1 is a schematic diagram of an apparatus for performing spectrum analysis on a quantity of molten metal (melt)

FIG. 1 is a schematic diagram of an apparatus 100 for performing spectrum analysis on a quantity of molten metal (melt). Referring to FIG. 1, a probe 110 is insertable into a quantity (melt) 115 of molten aluminum or other suitable casting preparation. The probe 110 is responsive to a laser source 120, and a spectrometer 130 receives emitted signals from the melt 115. A furnace 140 maintains the melt 115 at a suitable temperature, and an inert gas source 142 provides a cooling gas 144 and a "bubble" pressure 146 discussed further below. Both are regulated by corresponding flow meters 145 and 147, respectively. The spectrometer 130 and probe 110 arrangement may include any device capable of analyzing the chemical composition of the melt 115 within the furnace 140 in-situ.

In the example depicted herein, the apparatus 100 includes one or more devices configured to perform spectrographic analysis on emissions from high energy ablations of the melt 115, such as via Laser Induced Breakdown Spectroscopy (LIBS). Emissions may be induced from a laser directed at the molten metal such that the gathered data are based on a volume of molten metal ablated by the laser. A probe is placed inside the melt and a laser is fired through the probe either directly or through a fiber optic cable. A small amount of melt, at the probe tip, absorbs the laser light producing temperatures sufficiently high to heat and vaporize it into a gaseous plasma state. The resulting plasma emits light that is transmitted through the emission return fiber and into the spectrometer 130. This light is spectrally resolved into characteristic peaks, which may be used to uniquely identify the elements in the melt.

A computer 148 contains processors, memory and associated instructions and circuitry for controlling the laser source 120 and the spectrometer 130, and includes comparison logic 150 for interpreting spectroscopic data received by the spectrometer 130 to identify inclusions as disclosed herein.

Figure 2:
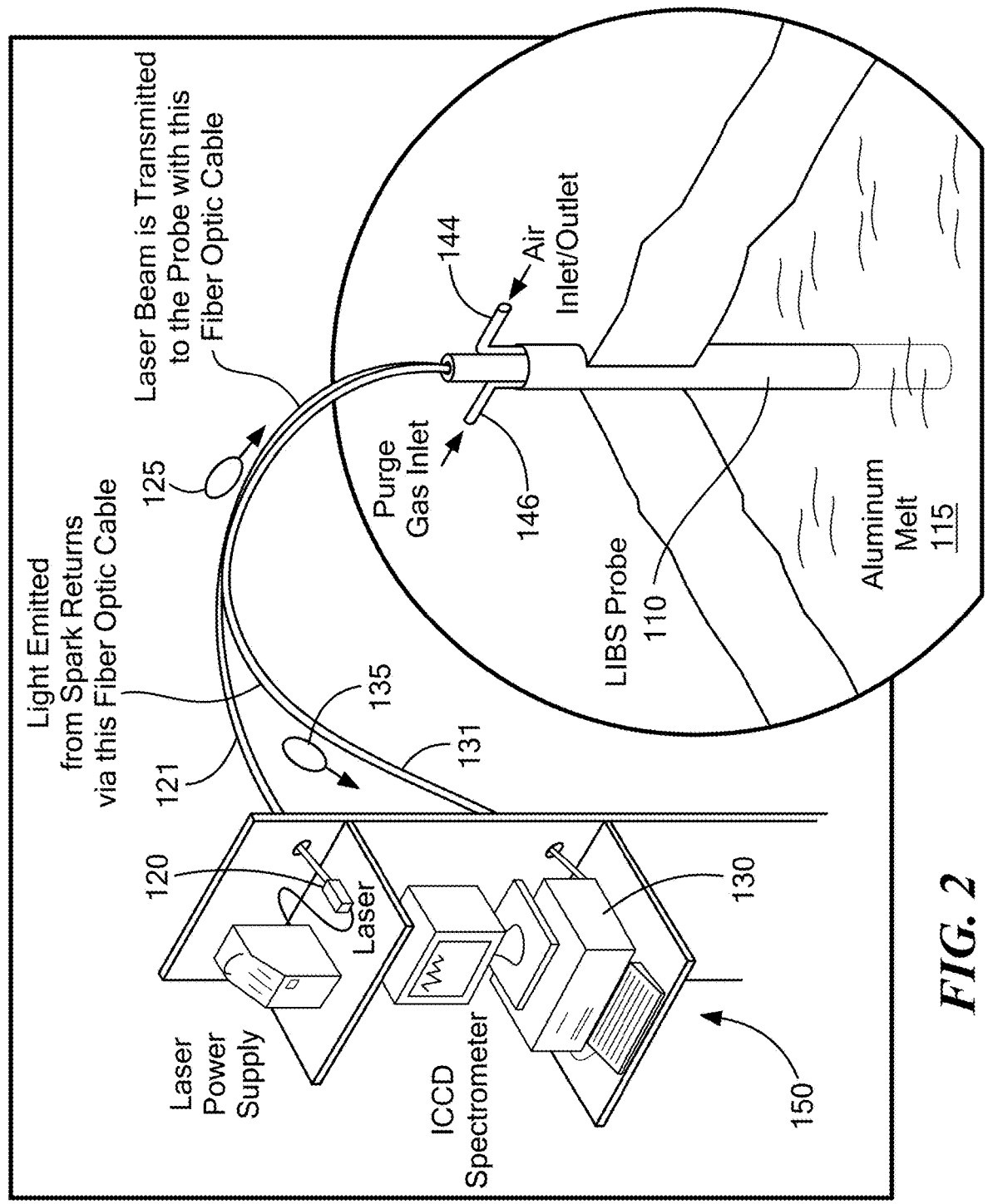
FIG. 2 is a perspective view of an apparatus according to the schematic of FIG. 1.

FIG. 2 is a perspective view of an apparatus according to the schematic of FIG. 1. Referring to FIGS. 1 and 2, the melt 115 includes aluminum, aluminum alloy or other suitable metal for casting. The probe 110 inserted into the molten metal is configured to introduce a gaseous bubble into the molten metal, and emit the laser through the gaseous bubble for ablating a volume adjacent the bubble The laser source 120 is carried to the melt 115 either by a laser optical fiber 121 or directly, and an emission return fiber 131 carries a spectrographic emission 135. The laser source 120 emits periodic laser pulses 125 for ablating a volume of the melt 115 for emitting electromagnetic energy defining the spectrographic emission 135.

The gas 146 forms a high pressure gaseous void, or bubble, to provide a target surface for the laser pulse 125 and allow transmission and gathering of the resultant plasma light. The cooling gas 144 offsets the high temperatures of the melt 115. The resulting spectral analysis extracts data from the emission that correlates elemental presence with a corresponding wavelength, and the magnitude of the atomic emissions at a particular wavelength denotes the quantity of respective elements. Since some elements, such as aluminum, maintain a substantial presence as a background element, an inclusion of an aluminum compound results in corresponding high levels, or "peaks" in the spectral analysis of both elements in the compound. For example, a magnesium oxide particle will result in corresponding peaks of both Mg and O in the same shot, or emission, as distinguished from normal background levels of magnesium and oxygen.

The introduction of energy, such as laser induced emissions, has been employed for metal analysis in the above described LIBS analysis, however conventional approaches identify only an overall composition of the melt, and cannot identify the presence or composition of inclusions, which appear as an anomalies or outliers in the spectrographic data based on the aberrations. Configurations herein determine a composition of the inclusion from simultaneous peaks of different elements. This may be performed based on corresponding peaks in the same spectroscopic shot.

Since the melt is a fluid volume, the laser pulses 125 affect different volumes throughout the melt in a series of "shots," providing a stream of spectrographic emissions 135. The melt 115 may be further agitated or stirred, or the probe 110 itself may be disposed through the melt 115.

In contrast to conventional approaches, which employ laser energy for determining a mix of individual elements present according to a predetermined ideal ratio or mix for casting, configurations herein detect a quantity and type of inclusions, typically compounds and/or particles that tend to compromise the casting by incidental occurrence or contamination.

Figure 3:
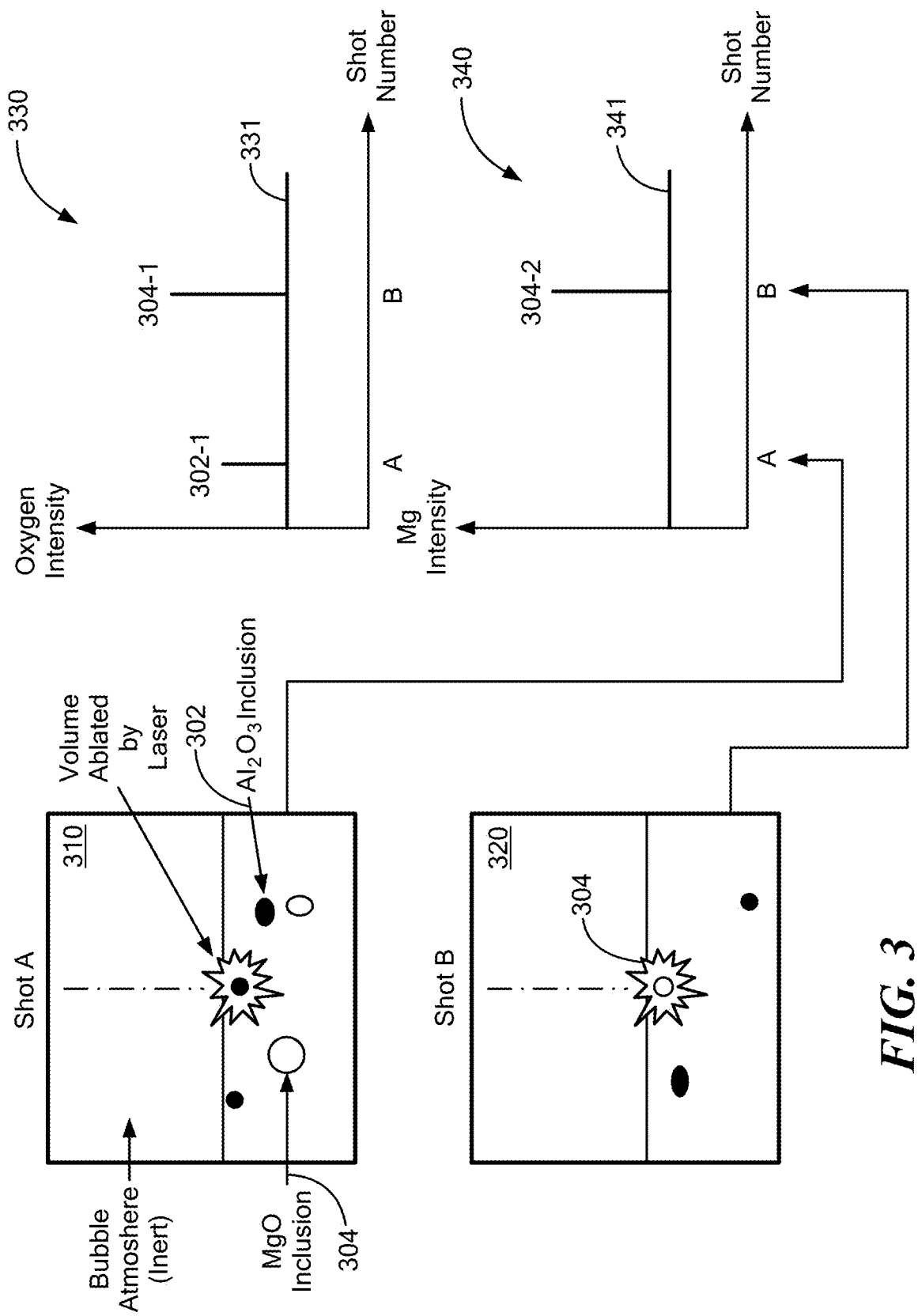
FIG. 3 is a diagram of spectroscopic data obtained from the apparatus of FIGS. 1 and 2.

FIG. 3 is a diagram of spectroscopic data obtained from the apparatus of FIGS. 1 and 2. Spectroscopic data includes a magnitude and a wavelength corresponding to an element of the volume ablated by the laser (or other energy source). Referring to FIGS. 1-3, In general, the LIBS spectrum generated through the probe 115 defines a "chemical fingerprint" that is representative of the bulk liquid composition. FIG. 3 shows shots 310 and 320 corresponding to energy emitted from a laser ablation from activation of the laser 120 into the melt 115 at different times. An oxygen graph 330 shows levels of oxygen from shots A and B, respectively, and a magnesium graph 340 depicts levels of magnesium of the same shots A and B. It is important to note that, in both cases, a background level 331, 341 respectively denotes expected levels of response in both inclusion and non-inclusion instances.

Elemental levels appear as a "spike" in a graph depicting the energy at a wavelength corresponding to a particular element, and extend above the expected background levels shown as horizontal lines 331, 341. When an inclusion is encountered, however, the spectrum will exhibit elevated levels of the elements present in the inclusion.

Unlike conventional approaches, the disclosed technique is capable of distinguishing between multiple types of inclusions. The example of FIG. 3 is an aluminum melt containing both aluminum oxide and magnesium oxide (MgO) particles. In Shot "A" 310, an Al$_2$O$_3$ particle 302 (inclusion) is analyzed, resulting in an elevated oxygen signal, shown as peak 302-1. In Shot "B" 320, the MgO particle 304 (inclusion) is encountered, resulting in elevated signals above the background for both the oxygen peak 304-1 and magnesium peak 304-2. The presence of magnesium in the spectrum from Shot "B" uniquely identifies the inclusion as MgO and not Al$_2$O$_3$. The appearance of corresponding spikes resulting from the same shot but for different elements indicates an inclusion of the compound defined by both peaks. Similar identifications can be made for inclusions comprised of different elements, and for different metals.

A single LIBS spectrum contains information about a small amount (micrograms) of the material being analyzed. This is advantageous when trying to identify small individual particles which are widely dispersed in a liquid medium. However, accurate characterization of the particle distribution in the liquid medium requires the collection and analysis of many (hundreds or thousands) of spectra to ensure that inclusions are present in a statistically significant number of spectra. In the case of sensing particles, especially those with elements that are also dissolved in the matrix, it is essential to filter out signals corresponding to a particle hit from those corresponding to the matrix. Because a particle is a concentrated mass of elements, elemental signal would be significantly higher than that of the matrix. In a time series where measurements are taken at a given rate, a particle hit would appear as an outlier.

In the disclosed approach, a plurality of individual LIBS spectra are collected from the molten metal being analyzed. The mean and standard deviation of the intensities of specified atomic emission lines (O and Mg in the previous example) are computed and the Nalimov or other suitable statistical test is applied to determine the outlier spectra that correspond to particle hits. The line intensities from these spectra are then used to compute the particle sizes. A calibration curve can then be generated relating the average peak intensity to the concentrations of different-sized particles as illustrated in FIG. 4.

Figure 4:
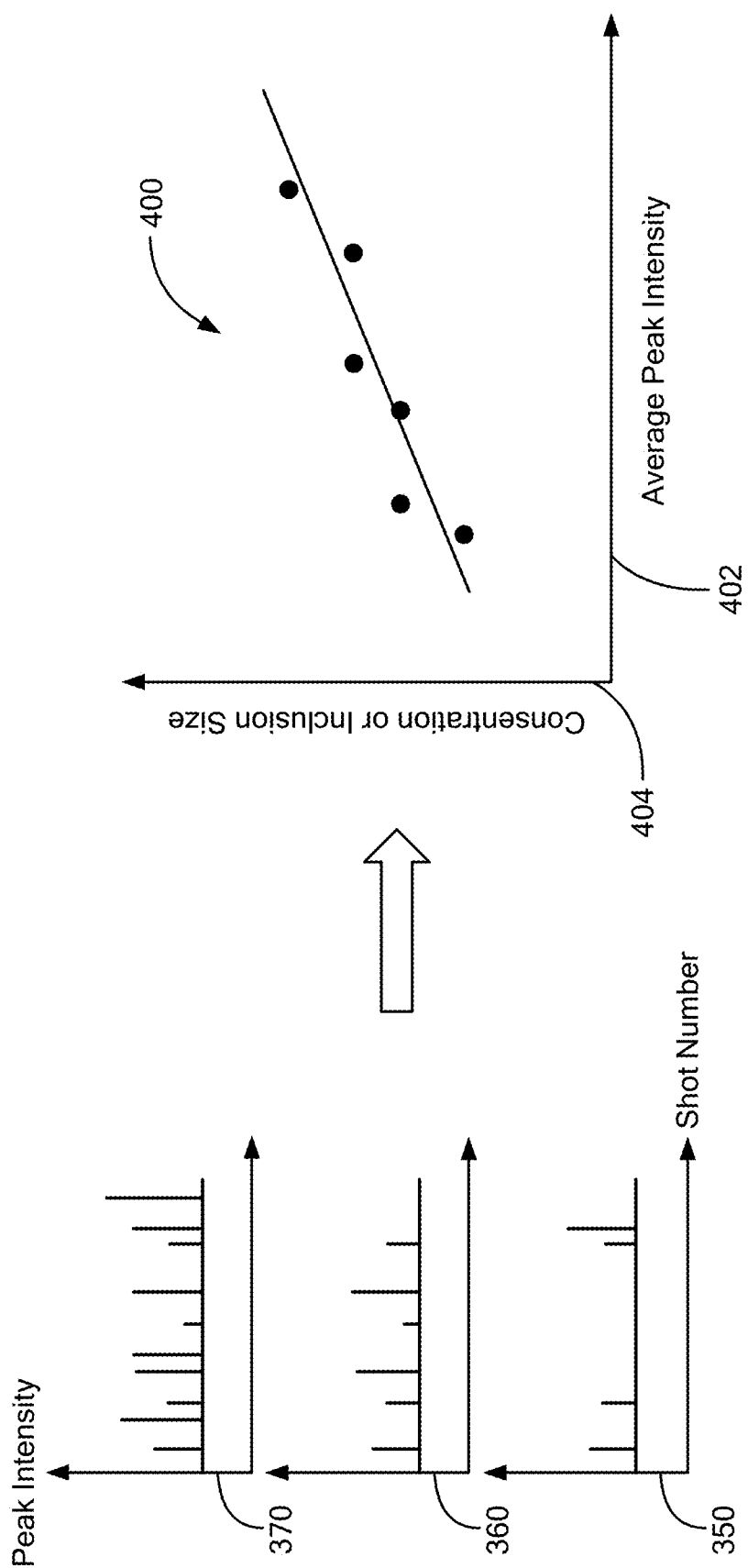
FIG. 4 shows peaks denoting elements in the spectroscopic data of FIG. 3.

FIG. 4 shows peaks denoting elements in the spectroscopic data of FIG. 3. FIG. 4 illustrates how a calibration curve may be constructed from successive iterations relating peak intensity to particle concentration by size. In the approach of FIG. 4, a number of individual spectra (shots) are collected from the melt 115 being analyzed. The mean and standard deviation of the intensities of specified atomic emission lines 350, 360, 370 (0 and Mg in the FIG. 3 example) are computed and the Nalimov or other suitable statistical test is applied to determine the outlier spectra that correspond to particle hits. The line intensities from these spectra are then used to compute the particle sizes. The peaks of 350 denote relatively few inclusions, 360 moderate inclusions, while the graph 370 depicts a higher concentration of inclusion "hits" for the element corresponding to the peaks. A calibration curve 400 can then be generated relating the average peak intensity 402 to the concentrations of different-sized particles 404.

In addition to the traditional use for determining melt composition, spectral analysis such as LIBS may be used for detecting inclusions. Because of the small size of inclusions and the presence of convection in resistance and induction furnaces, particles are constantly moving throughout the melt. If an inclusion is present where the metal was vaporized, the spectra will reveal its presence and composition. As illustrated in FIG. 3, by focusing on an oxygen signal in the spectra, it will vary depending on whether an inclusion is present within the sampling volume. The concentrated amount of oxygen atoms within the particle will create a spike in oxygen signal observed by the spectrometer. In addition, if an MgO particle is ablated by the laser pulse, both a spike in Mg and O signal will be observed, allowing for differentiation between inclusions of different compositions. In principle, the size of the elemental intensity spike from a particle "hit" is proportional to the size of the particle. A large oxide inclusion would emit a higher oxygen signal than a small inclusion. A clean metal will have few inclusions, which would correspond to few spikes in elemental intensity. A dirty metal, rich in inclusions, would have many spikes. Therefore, the average elemental intensity and number of hits varies with the concentration of inclusions present.

Using the MgO inclusion as an example, inclusion concentration, X, can be calculated, through the relationship:

$$X = \text{(Average equivalent concentration for hits)} \times \text{(sampling frequency of hits)}$$

Because oxygen is insoluble in aluminum, concentration (referring to dissolved elements) is not used in the calculation. Fortunately, elemental intensity can be substituted as it is directly proportional to elemental concentration. Provided the same number of shots are taken every sampling run, frequency can be substituted by the number of particle hits. For the case of sensing oxide inclusions in molten metal, an equivalent relationship, relating the product of average particle hit intensity and the number of hits, can be established:

$$X \propto \overline{\left(\frac{I_O}{I_{Al}}\right)} \times N_{Hits}$$

Where:

$$\overline{\left(\frac{I_O}{I_{Al}}\right)}$$

is the average oxide hit intensity (normalized by aluminum intensity) and $N_{Hits}$ is the number of hits in the measurement run As a result, the overall measurement is reduced to the product of two statistical samples. The use of particle hit average, instead of the average over all measurements, increases the signal-to-noise ratio and sensitivity. It is beneficial to avoid interpreting an errant spike in background noise as an elemental peak. In a time series, where measurements are taken at a given rate, a particle hit would appear as an outlier in the resultant data set. Unlike conventional spectral analysis employing techniques such as LIBS, the goal of particle analysis is to investigate outliers in signal. Approaches such as the Nalimov test, a statistical test for determining if a data point is an outlier, or other suitable outlier processing, may be employed in the analysis.

Figure 5:
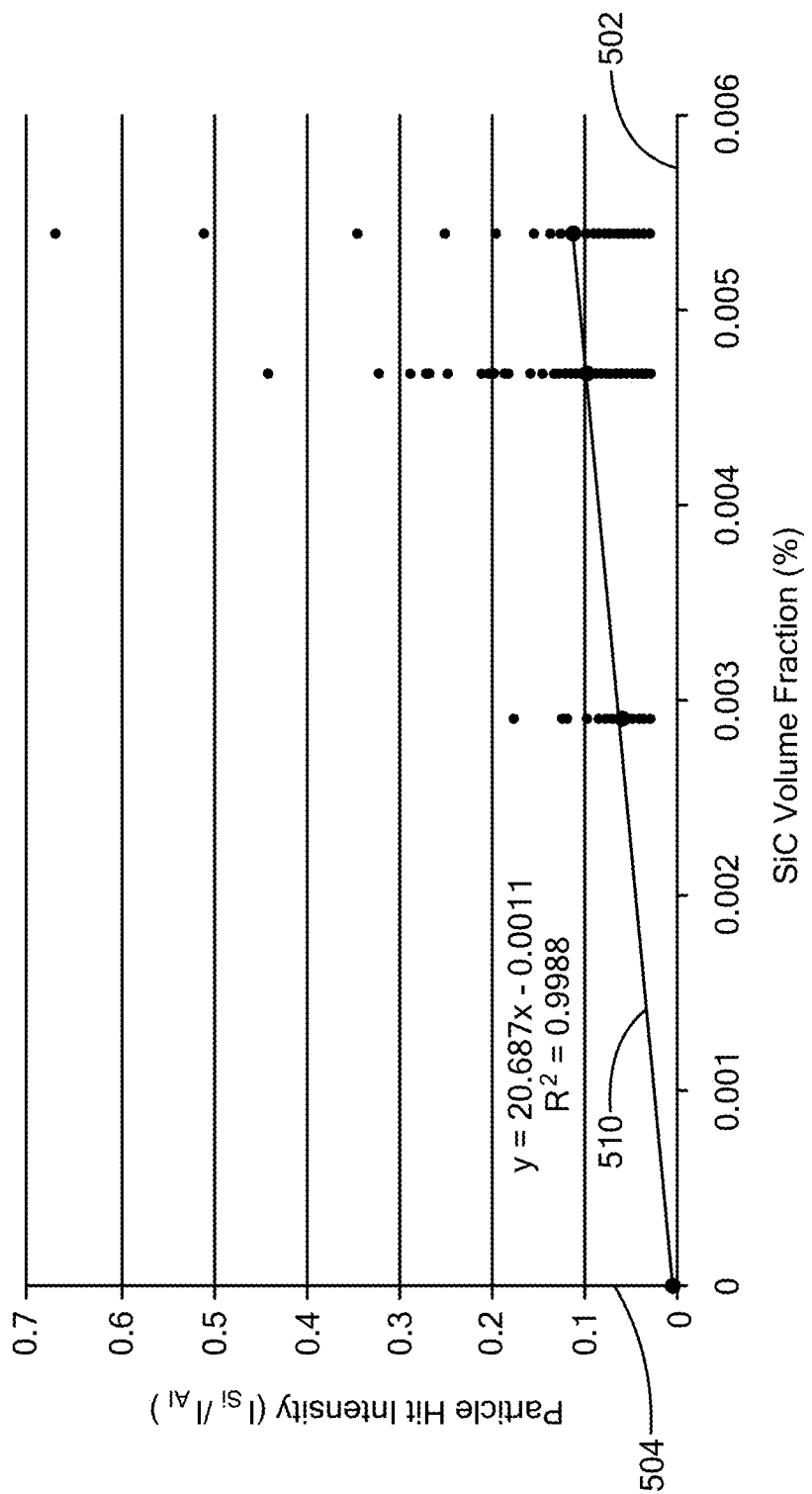
FIG. 5 shows a calibration graph for aggregating a plurality of peaks as in FIG. 4.

FIG. 5 shows a calibration graph 500 for aggregating a plurality of peaks as in FIG. 4. The calibration curve of FIG. 5 shows a volume fraction of SiC particles 502 as a function of a normalized peak intensity 504 for silicon. The plot points denote individual shots defining an average denoted by the line 510.

Figure 6:
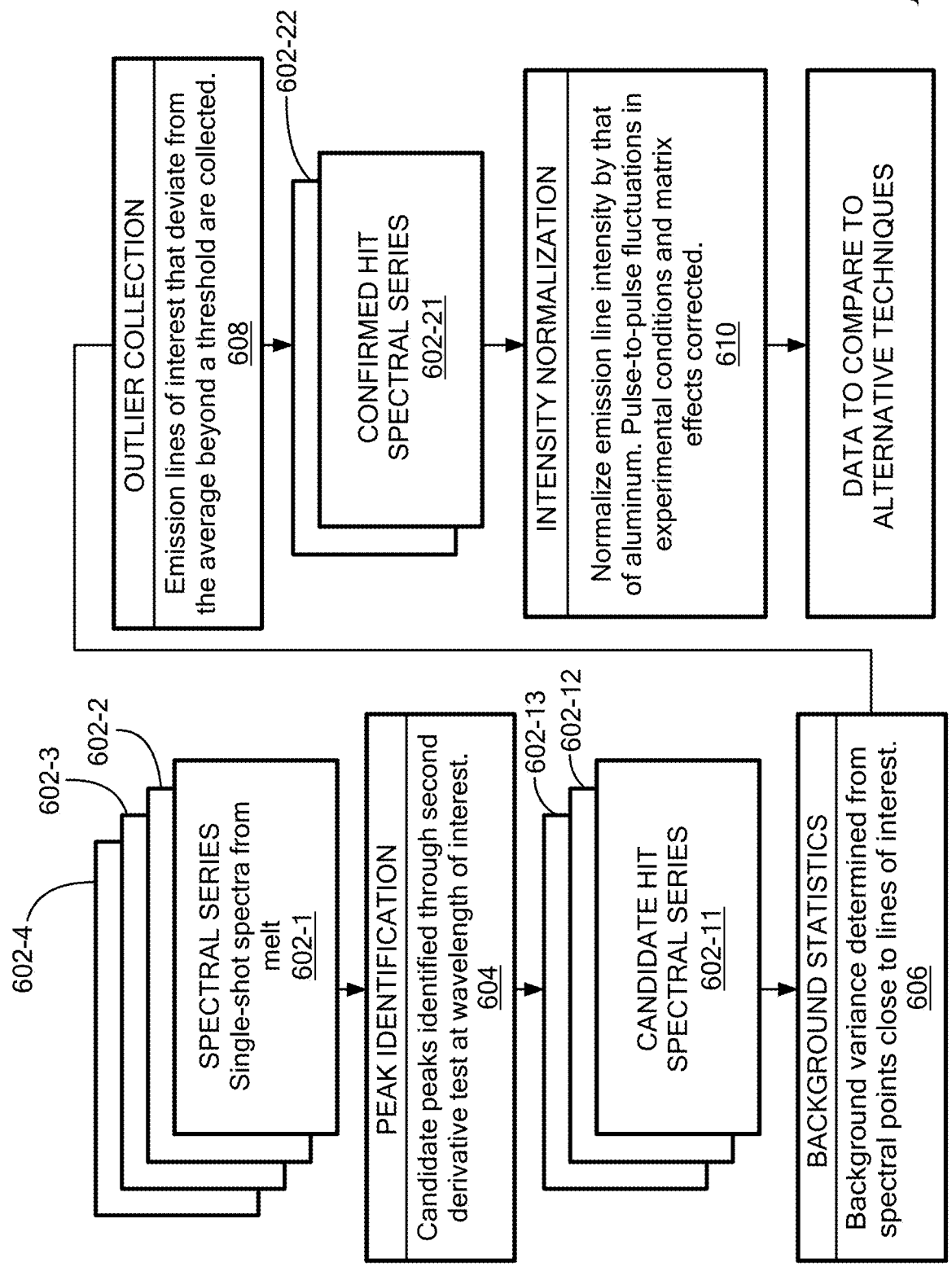
FIG. 6 shows a flowchart for inclusion analysis using the spectroscopic data gathered in FIG. 3.

FIG. 6 shows a flowchart 600 for inclusion analysis using the spectroscopic data gathered in FIG. 3. Referring to FIGS. 1 and 6, at step 601, the apparatus induces the series of shots 602-1 . . . 602-4 (602 generally) by periodic laser activation, such that each activation affects a different volume based on the flow. Laser shots may occur at any suitable rate, typically between 1 and 10 per second. This may further include agitating or mixing the molten metal to generate a flow that disposes the inclusions adjacent the probe. The comparison logic 150 receives data based on a series of the shots 602 from the molten metal, and identifies peaks that denote outliers from an expected composition exhibited by the data, as depicted at step 604.

Since the melt 115 includes many expected or intended elements that also generate spectroscopic data, the comparison logic 150 needs to identify a baseline indicative of a predetermined composition of the molten metal. The comparison logic 150 generates a candidate hit spectral series 602-11 . . . 602-13 from the shots 602 for denoting a baseline indicative of elements corresponding to the predetermined composition. In the case of an aluminum melt, for example, a substantial presence of Al would be expected. These background statistics are used to compute a background variance from spectral points close to lines of interest, as disclosed at step 606.

The comparison logic 150 continues coalescing the received data from the series of shots 602 taken periodically over time and applies an outlier test to the series of shots for correlating the peaks to differentiate inclusions. This defines an outlier collection based on emission lines of interest that deviate from the average beyond a threshold, as depicted at step 608. In other words, the comparison logic 150 identifies peaks above the baseline (and further beyond a "false" hit threshold) as indicative of an inclusion, leading to a confirmed hit spectral series 602-21 . . . 602-22.

The comparison logic 150 can determine a composition of an inclusion based on a wavelength corresponding to the identified peaks. A correspondence of a plurality of peaks is indicative of an inclusion compound including elements denoted by the respective wavelengths of the plurality of peaks. Intensity normalization of the peaks allows identification of true inclusions as contrasted with expected or normal elements, as shown at step 610. The result is inclusion magnitude (size) and typing (elemental composition) determination based on an in-situ (real time) melt sample.

Figure 7:
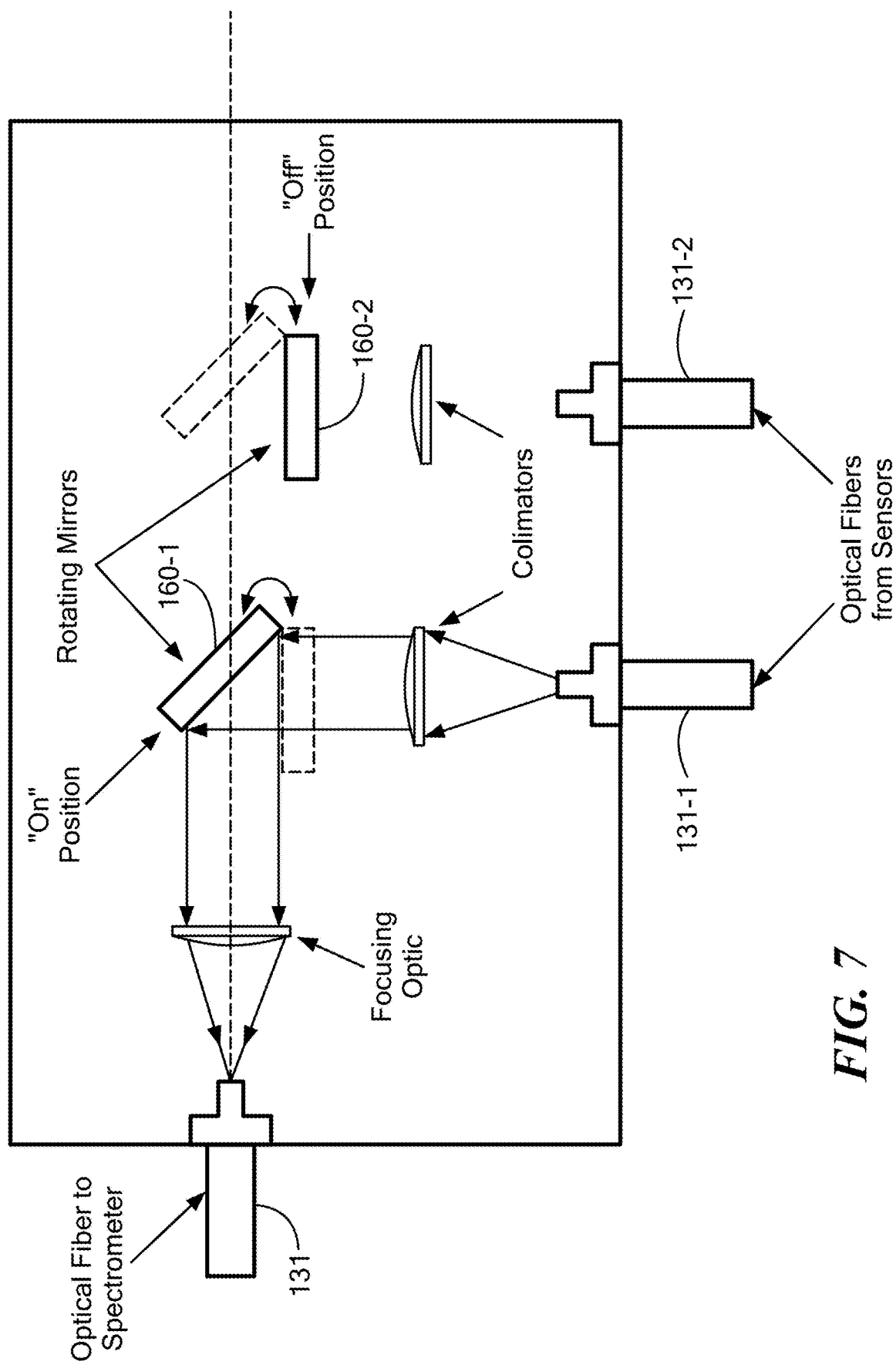
FIG. 7 shows multiplexing of spectroscopic data gathered from multiple melts in a production facility.

FIG. 7 shows multiplexing of spectroscopic data gathered from multiple melts in a production facility. Multiple melts 115 may be employed for a volume production facility. In such an arrangement, shots gathered from each melt may be multiplexed to a common spectroscopy analysis apparatus 100. A plurality of optic fibers 131-1 . . . 131-2 receive spectroscopic signals from each melt, and a corresponding plurality of rotating mirrors 160-1 . . . 160-2 selectively activate to direct the signals to the emission return fiber 131.

Those skilled in the art should readily appreciate that electronic logic and instructions as disclosed herein are open to implementation in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of inclusion testing for molten metal, comprising:
receiving a plurality of spectroscopic shots of a molten metal, each shot defined by data gathered from an induced emission from the molten metal;
identifying a baseline indicative of a predetermined composition of the molten metal;
denoting the baseline indicative of elements corresponding to the predetermined composition;
identifying an aberration in the data indicative of an inclusion, the inclusion defined by a magnitude and a wavelength, the wavelength corresponding to an element;
determining, based on a plurality of identified aberrations, a quantity of the element denoted by the identified aberrations, the aberrations defining peaks in the data, each peak corresponding to presence of an element in a volume from which the emission occurs, further comprising:
identifying peaks above the baseline as indicative of an inclusion; and
determining a composition of the inclusion based on a wavelength corresponding to the identified peaks.

2. The method of claim 1 further comprising identifying a composition of the inclusion based on corresponding peaks in the same spectroscopic shot.

3. The method of claim 2 further comprising determining a composition of the inclusion from simultaneous peaks of different elements.

4. The method of claim 2 further comprising inducing the emission from a laser directed at the molten metal such that the gathered data is based on a volume of molten metal ablated by the laser.

5. The method of claim 4 further comprising inserting a probe into the molten metal, the probe configured to:
introduce a gaseous bubble into the molten metal; and
emit the laser through the gaseous bubble for ablating a volume adjacent the bubble.

6. The method of claim 2 further comprising:
receiving data based on a series of shots from the molten metal; and
identifying peaks that denote outliers from an expected composition exhibited by the data.

7. The method of claim 2 wherein a size of the inclusion is in the range of 10 um 1 mm.

8. The method of claim 2 wherein the plurality of spectroscopic shots are obtained at an interval between 1-10 per second.

9. The method of claim 2 wherein the compound composition is identified based on outliers of captured wavelength intensities.

10. A method of inclusion testing for molten metal, comprising:
    receiving a plurality of spectroscopic shots of a molten metal, each shot defined by data gathered from an induced emission from the molten metal;
    agitating the molten metal to generate a flow that disposes the inclusions;
    inducing the series of shots by periodic laser activation, each activation affecting a different volume based on the flow;
    identifying an aberration in the data indicative of an inclusion, the inclusion defined by a magnitude and a wavelength, the wavelength corresponding to an element;
    determining, based on a plurality of identified aberrations, a quantity of the element denoted by the identified aberrations, the aberrations defining peaks in the data, each peak corresponding to presence of an element in a volume from which the emission occurs;
    coalescing the received data from the series of shots taken periodically over time, and
    applying an outlier test to the series of shots for correlating the peaks to differentiate inclusions identifying peaks that denote outliers from an expected composition exhibited by the data.

11. The method of claim 10 wherein a correspondence of a plurality of peaks is indicative of an inclusion compound including elements denoted by the respective wavelengths of the plurality of peaks.

12. An inclusion measurement device, comprising:
    a heat resistant probe adapted for insertion into molten metal for inducing a spectroscopic emission from the molten metal, the emission defining inclusions in the molten metal based on concurrent appearance of wavelengths corresponding to elements of a compound in the inclusion resulting from agitation that generates a flow that disposes the inclusions;
    a laser source coupled to the probe for periodically firing a plasma inducing light resulting in the emission; and
    a spectrometer configured to receive spectroscopic data from the emission; and
    a detection circuit configured for interpreting the spectroscopic data based on the emission, the spectroscopic data defining peaks corresponding to elements in the inclusion, the detection circuit adapted to identify peaks indicative of the elements in the inclusion, each peak corresponding to a presence and a quantity of an element in a volume from which the emission occurs, the detection circuit further operable to:
    coalesce the received spectroscopic data from a series of spectroscopic shots taken periodically over time;
    identify a baseline indicative of a predetermined composition of the molten metal;
    denote the baseline indicative of elements corresponding to the predetermined composition;
    identify an aberration in the spectroscopic data indicative of an inclusion, the inclusion defined by a magnitude and a wavelength, the wavelength corresponding to an element;
    determine, based on a plurality of identified aberrations, a quantity of the element denoted by the identified aberrations, the aberrations defining peaks in the data, each peak corresponding to presence of an element in a volume from which the emission occurs;
    employ comparison logic for identifying elements corresponding to the wavelengths denoted by the spectroscopic data, the comparison logic identifying a magnitude of the peaks corresponding to the elements in the inclusion; and
    identify a composition of the inclusion based on corresponding peaks in the same spectroscopic shot.

13. The device of claim 12 wherein the comparison logic receives data based on a plurality of shots, each shot responsive to an induced emission from the molten metal, the comparison logic configured to identify the peaks represented in the same shot.

* * * * *

UNITED STATES PATENT AND TRADEMARK OFFICE
CERTIFICATE OF CORRECTION

Page 1 of 1

PATENT NO. : 10,753,878 B2
APPLICATION NO. : 16/136232
DATED : August 25, 2020
INVENTOR(S) : Shaymus W. Hudson et al.

It is certified that error appears in the above-identified patent and that said Letters Patent is hereby corrected as shown below:

In the Specification

In Column 1, Line 2, add:
--STATEMENT OF FEDERALLY SPONSORED RESEARCH AND DEVELOPMENT
This invention was made with government support under grant ARPA-E; DE-AR 0000417. The government has certain rights in the invention.--

Signed and Sealed this
Third Day of November, 2020

Andrei Iancu
*Director of the United States Patent and Trademark Office*